United States Patent [19]
Weder et al.

[11] Patent Number: 5,228,236
[45] Date of Patent: Jul. 20, 1993

[54] FLOWER POT OR FLOWER POT COVER WITH BASE HAVING OVERLAPPING FOLD SOME OF WHICH ARE CONNECTED AND SOME OF WHICH ARE UNCONNECTED

[75] Inventors: Donald E. Weder; Joseph G. Straeter, both of Highland, Ill.

[73] Assignee: Highland Supply Corporation, Highland, Ill.

[21] Appl. No.: 701,390

[22] Filed: May 16, 1991

Related U.S. Application Data

[63] Continuation-in-part of Ser. No. 397,114, Aug. 22, 1989, Pat. No. 5,029,412, which is a continuation-in-part of Ser. No. 366,588, Jun. 15, 1989, Pat. No. 5,111,613, which is a continuation-in-part of Ser. No. 219,083, Jul. 13, 1988, Pat. No. 4,897,031.

[51] Int. Cl.$^5$ .............................................. A01G 9/02
[52] U.S. Cl. ...................................................... 47/72
[58] Field of Search .............................................. 47/72

[56] References Cited

U.S. PATENT DOCUMENTS

| | | | |
|---|---|---|---|
| 1,697,751 | 1/1929 | Blake | 47/72 |
| 2,090,778 | 7/1940 | Krasowski | 47/72 |
| 2,302,259 | 11/1942 | Rothfuss | 42/72 |
| 2,355,559 | 8/1944 | Renner | 47/72 |
| 2,510,120 | 6/1950 | Leander | 47/72 |
| 4,773,182 | 9/1988 | Weder | 47/72 |

Primary Examiner—Henry E. Raduazo
Attorney, Agent, or Firm—Dunlap, Codding & Lee

[57] ABSTRACT

A flower pot or flower pot cover comprising a base and a skirt connected to an upper end of the base. The base includes a plurality of overlapping folds for providing structural integrity. The base is divided into a plurality of segments with each segment extending generally between the upper and the lower end of the base and each segment extending a distance circumferentially about the base. The overlapping folds in some of the segments are connected and the overlapping folds in the remaining segments are unconnected to provide an overall pleated appearance.

6 Claims, 1 Drawing Sheet

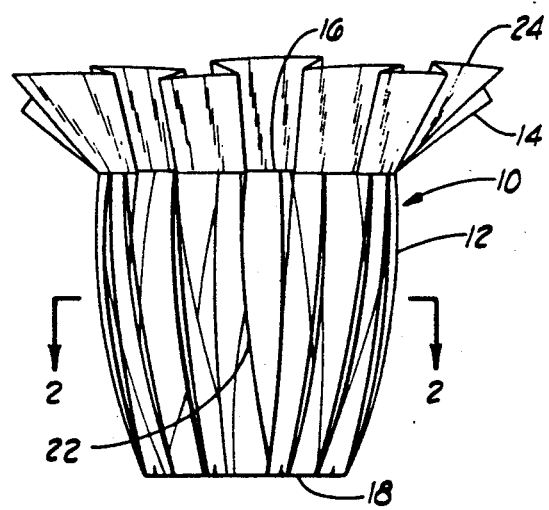
FIG. 1
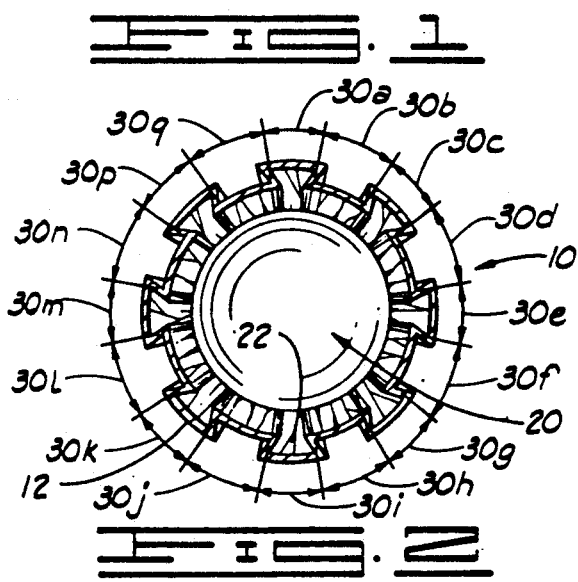
FIG. 2
FIG. 3

FLOWER POT OR FLOWER POT COVER WITH BASE HAVING OVERLAPPING FOLD SOME OF WHICH ARE CONNECTED AND SOME OF WHICH ARE UNCONNECTED

CROSS REFERENCED TO RELATED APPLICATIONS

The present invention is a continuation-in-part of the patent a U.S. Ser. No. 397,114, filed August 22, 1989 now U.S. Pat. No. 5,029,412 entitled "FLOWER POT OR FLOWER POT COVER WITH PLEATED SKIRT AND OR BASE", which is a continuation-in-part of Ser. No. 366,588, filed June 15, 1989 now U.S. Pat. No. 5,111,613, entitle "PLEATED FLOWER POT OR FLOWER POT COVER", which is a continuation-in-part of Ser. No. 219,083, filed July 13, 1988, now U.S. Pat. No. 4,897,031, issued January 30, 1990, entitled "ARTICLE FORMING SYSTEM". The present invention also is related to File No. 8400.346, entitled "FLOWER POT OR FLOWER POT COVER WITH PLEATED BASE".

FIELD OF THE INVENTION

The present invention relates to flower pot covers or flower pots having a skirt and a base with folds in the base wherein the folds in the base are selectively connected.

BRIEF DESCRIPTION OF THE DRAWINGS

FIG. 1 is a side elevational view of a flower pot or flower pot cover constructed in accordance with the present invention.

FIG. 2 is a sectional view of the flower pot or flower pot cover of FIG. 1, taken substantially along the lines 2—2 of FIG. 1.

FIG. 3 is a top elevational view of the flower pot or flower pot cover of FIG. 1.

DESCRIPTION OF THE PREFERRED EMBODIMENTS

Shown in FIGS. 1, 2 and 3 and designated therein by the reference numeral 10 is a flower pot or flower pot cover constructed in accordance with the present invention. In one embodiment, the article shown in the drawings is a flower pot cover which adapted for providing a decorative cover for a flower pot. In one other embodiment, the article shown in the drawings is a flower pot which is adapted to support floral groupings (defined below) in soil in a manner well known in the art.

The flower pot or flower pot cover 10 comprises a base 12 (FIGS. 1 and 2) and a skirt 14 (FIGS. 1 and 3).

The base 12 has an upper end 16 (FIGS. 1 and 3) and a lower end 18 (FIG. 1. An object opening 20 (FIG. 2) is formed through the upper end 16 and the object opening 20 extends a distance through the base 12 with the base 12 substantially encompassing the object opening 20 except for the open upper end 16 of the base 12. The object opening 20 is the space substantially encompassed by the base 12.

The base 12 has a plurality of overlapping folds 22 (only one of the overlapping fold 22 being specifically designated by a reference numeral in FIGS. 1 and 2) which extend at various angles and which have different and various lengths. At least some of the overlapping folds 22 are substantially fixed or connected. The overlapping folds 22 cooperate to provide structural integrity for maintaining the preformed shape of the base 12.

The skirt 14 is connected to the upper end 16 of the base 12. Preferably, the skirt 14 is formed integrally with the base 12. The skirt 14 extends outwardly from the upper end 16 of the base 12 terminating with an outer peripheral surface 24.

The flower pot or flower pot cover 10 is formed by taking a sheet of material and disposing the sheet of material between a male and female mold. When the molds are brought together in mating engagement with the sheet of material therebetween the overlapping folds 22 are formed. The folds 22 can be substantially permanently connected or fixed by heat sealing the overlapping folds 22, or adhesively connecting the overlapping folds 22.

Additionally a relatively thin film of substantially linearly linked processed organic polymer does not substantially deteriorate in sunlight. Processed organic polymer films having carbon atoms both linearly linked and cross linked, and some cross linked polymer films, also may be suitable for use in the present invention provided such films are substantially flexible and can be made in a sheet-like format for wrapping purposes consistent with the present invention.

The flower pot or flower pot cover 10 may be constructed of a single layer of material or a plurality of layers of the same or different types of material. The flower pot or flower pot cover 10 may have any thickness. In one preferred embodiment, the flower pot or flower pot cover 10 is constructed from two polypropylene films laminated together (a 20"×15" sheet of Mobil 270 ABW white opaque film laminated to a 20"×15" sheet of Mobil 220 AB clear film). The flower pot or flower pot cover 10 preferably has a thickness in a range of from less than about 1.0 mil to about 2.5 mils, although the thickness of the flower pot or flower pot cover 10 may be in a range from less than about 1.0 mil to about 30 mils and preferably the thickness is less than about 6 mils.

The term "cling wrap" as used herein may be any material which is capable of connecting to flower pot 10 and/or itself upon contacting engagement and is wrappable about flower pot 10 whereby portions of the cling wrap contactingly engage and connect to other portions of the cling wrap and/or the flower pot 10 for generally securing the sheet of material 32 wrapped about at least a portion of the flower pot 10. This connecting engagement is generally temporary in that the cling wrap material may be easily removed without tearing same. Preferably the cling wrap material is constructed and treated if necessary, from polyethylene such as Cling Wrap made by Glad ®, First Brands Corporation, Danbury, Connecticut. Generally, the cling wrap material will range in thickness from less than about 0.2 mils to about 10 mils, and preferably less than about 0.5 mils to about 2.5 mils and most preferably from less than about 0.6 mils to about 2 mils. However, any thickness of cling wrap material may be utilized in accordance with the present invention which permits the cling material to function as previously described.

In a preferred form, a decorative pattern is formed or printed or embossed or otherwise disposed on or incorporated in the outer peripheral surface of the flower pot or flower pot cover 10. The term "decorative pattern" as used herein means a color and/or an embossed pattern and/or other decorative surface ornamentation, including, but not limited to printed designs, coatings, flocking or metallic finishes. The flower pot or flower pot cover 10 may be constructed of a sheet of material which is totally or partially clear or tinted transparent material. It also should be noted that a decorative pattern may be incorporated on the interior surface of the base 12 formed by the object opening 20 which may be desired in some applications.

The term "floral grouping" as used herein means cut fresh flowers, artificial flowers, other fresh and/or artificial plants or other floral materials and may include other secondary plants and/or ornamentation which add to the aesthetics of the overall floral grouping.

The base 12 is divided into a plurality of segments with each of the segments 30 with the respective individual segments being designated in FIG. 2 by the individual reference numerals 30a, 30b, 30c, 30d, 30e, 30f, 30g, 30h, 30i, 30j, 30k, 30l, 30m, 30n, 30p, 30q. Each of the segments 30 defines an area of the base extending between the upper end 16 and the lower end 18 of the base 12. Each of the segments 30 extends a distance circumferentially about the base 12. The overlapping folds 22 in the segments 30a, 30c, 30e, 30g, 30i, 30k, 30m and 30p are unconnected forming unconnected segments 30. The overlapping folds 22 in the segments 30b, 30d, 30f, 30h, 30j, 30l, 30n and 30q are connected and sealed forming connected segments. Each unconnected segment is disposed generally between two of the connected segments for forming pleats extending generally between the upper and the lower ends 16 and 18 of the base 12.

What is claimed is:

1. A flower pot or flower pot cover, comprising:
a base having an upper end and a lower end with an object opening extending through the upper end and having a plurality of overlapping folds formed in the base for cooperating to provide structural integrity to the base, the base being divided into a plurality of segments with each segment defining an area of the base extending between the upper end and the lower end of the base and with each of the segments extending a distance circumferentially about the base, the overlapping folds in some of the segments being connected forming connected segments and the overlapping folds in the remaining segments being unconnected forming unconnected segments.

2. The flower pot or flower pot cover of claim 1 wherein each unconnected segment is disposed between two connected segments.

3. The flower pot or flower pot cover of claim 1 further comprising:
a skirt connected to the upper end of the base and extending a distance outwardly from the upper end of the base terminating with an outer peripheral surface, the skirt having a plurality of folds extending from about the upper end of the base outwardly to the outer peripheral surface of the skirt.

4. The flower pot or flower pot cover of claim 1 wherein the flower pot cover is constructed of a material selected from a group of materials consisting of a man-made organic polymer film, paper, (treated or untreated or combinations thereof), burlap, cloth (natural or synthetic or combinations thereof), denim, foil, cling wrap, or cellophane of combinations thereof.

5. The flower pot or flower pot cover of claim 3 wherein the base and the skirt each are defined further as having a thickness in a range from less than about 1.0 mil to about 30 mils.

6. The flower pot or flower pot cover of claim 3 wherein the base and the skirt each are defined further as having a thickness of less than about 6 mils.

* * * * *